(12) United States Patent
Hu et al.

(10) Patent No.: US 9,286,319 B2
(45) Date of Patent: Mar. 15, 2016

(54) METHOD, SYSTEM AND SERVING NODE FOR DATA BACKUP AND RESTORATION

(75) Inventors: Huanhuan Hu, Shenzhen (CN); Haowei Li, Shenzhen (CN); Bin Guo, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 262 days.

(21) Appl. No.: 14/006,674

(22) PCT Filed: Aug. 16, 2011

(86) PCT No.: PCT/CN2011/078466
§ 371 (c)(1),
(2), (4) Date: Sep. 22, 2013

(87) PCT Pub. No.: WO2012/126232
PCT Pub. Date: Sep. 27, 2012

(65) Prior Publication Data
US 2014/0025638 A1    Jan. 23, 2014

(30) Foreign Application Priority Data
Mar. 22, 2011    (CN) .......................... 2011 1 0069873

(51) Int. Cl.
*G06F 17/30* (2006.01)
*H04L 29/08* (2006.01)
*G06F 11/14* (2006.01)

(52) U.S. Cl.
CPC ...... *G06F 17/30212* (2013.01); *G06F 11/1464* (2013.01); *G06F 11/1469* (2013.01);
(Continued)

(58) Field of Classification Search
CPC ............ G06F 11/1458; G06F 11/1461; G06F 11/1464; G06F 11/1469; G06F 11/1448; G06F 17/30212
USPC .................................................. 707/640, 674
See application file for complete search history.

(56) References Cited

U.S. PATENT DOCUMENTS

| 7,249,281 B2 | 7/2007 | Shirley et al. |
| 7,483,927 B2 | 1/2009 | Anglin et al. |

(Continued)

FOREIGN PATENT DOCUMENTS

| CN | 1815475 A | 8/2006 |
| CN | 1976283 A | 6/2007 |

(Continued)

OTHER PUBLICATIONS

Supplementary European Search Report in European application No. 11861783.6, mailed on Feb. 26, 2015.

(Continued)

*Primary Examiner* — Thu-Nguyet Le
(74) *Attorney, Agent, or Firm* — Oppedahl Patent Law Firm LLC

(57) ABSTRACT

Disclosed is a method, a system and a serving node for data backup and restoration, in which a serving node generates a backup schedule after receiving a data backup request, uploads the schedule to a cluster public storage block, each serving node sends a copy to be backed up to a target node for consolidation; a client sends a data record in a consolidated copy to the serving node through a data writing request, generates a data distribution table according to a load balancing principle, sends the request to other serving nodes according to the table to perform a write operation, the client sends the data writing request for a next data record after the write operation, until the copy is completely restored. The backup and restoration is performed in a complex cluster network accounting for performance differences among serving nodes, data consistency, data integrity and data uniform distribution.

17 Claims, 5 Drawing Sheets

(52) U.S. Cl.
CPC ...... *G06F17/30289* (2013.01); *H04L 67/1002* (2013.01); *H04L 67/1097* (2013.01); *H04L 67/2857* (2013.01); *G06F 11/1461* (2013.01); *G06F 2201/82* (2013.01)

(56) References Cited

U.S. PATENT DOCUMENTS

| | | | |
|---|---|---|---|
| 7,941,404 | B2 | 5/2011 | Garimella et al. |
| 2004/0210608 | A1* | 10/2004 | Lee .................... G06F 11/1451 |
| 2005/0028026 | A1 | 2/2005 | Shirley et al. |
| 2005/0108484 | A1* | 5/2005 | Park ................... G06F 11/1448 711/162 |
| 2006/0129685 | A1 | 6/2006 | Edwards, Jr. |
| 2006/0179085 | A1 | 8/2006 | Kaijima et al. |
| 2006/0200502 | A1* | 9/2006 | Tanaka ................... G06F 8/665 |
| 2007/0130229 | A1 | 6/2007 | Anglin et al. |
| 2007/0214196 | A1 | 9/2007 | Garimella et al. |
| 2010/0257403 | A1 | 10/2010 | Virk |
| 2011/0264877 | A1* | 10/2011 | Amano ................. G06F 3/0613 711/162 |

FOREIGN PATENT DOCUMENTS

| | | |
|---|---|---|
| CN | 101014002 A | 8/2007 |
| CN | 101042662 A | 9/2007 |
| CN | 101394424 A | 3/2009 |
| CN | 101808012 A | 8/2010 |

OTHER PUBLICATIONS

International Search Report in international application No. PCT/CN2011/078466, mailed on Dec. 8, 2011. (3 pages—see entire document).

English Translation of the Written Opinion of the International Search Authority in international application No. PCT/CN2011/078466, mailed on Dec. 8, 2011. (5 pages—see entire document).

Data storage backup strategy and scheduling research, Apr. 15, 2010. (11 pages).

Distributed file storage platform backup and restore system design and implementation, Sep. 1, 2008. (75 pages).

\* cited by examiner

METHOD, SYSTEM AND SERVING NODE FOR DATA BACKUP AND RESTORATION

TECHNICAL FIELD

The application relates to a distributed cache system in cloud computing, and in particular to a method, system and serving node for data backup and restoration.

BACKGROUND

Development and Convergence of conventional computer technologies and network technologies, such as grid computing, distributed computing, parallel computing, utility computing network storage technologies, virtualization technologies, load balance technologies and the like, result in cloud computing. The cloud computing intends to integrate a plurality of relatively low cost computing entities over a network into a system having significant computing power. Distributed cache is an aspect of the cloud computing, and functions to provide distributed storage service for mass data and high-speed read and write capability.

Generally, a distributed cache system is composed of several server nodes (also known as serving node) and clients interconnected with each other. The server node is used to store data and the client may perform data manipulation on the server, such as writing, reading, updating, deleting and the like. Generally, the written data would not only be stored in a single server node. Instead, copies of the data file may be stored in a plurality of nodes for backup. Each of the copies comprises one or more data records composed of Keys and Values, a Key serves as an index to the data and a Value is data content represented by the Key. Logically, there is a one-to-one correspondence between the Keys and the Values. Attribute information, such as a version number, a timestamp and the like is added to each data record when the data record is actually stored, so as to ensure consistency of the data stored in the distributed cache system. The attribute information is stored in the data records of the copy. In a distributed cache system cluster (hereinafter referred to as cluster), each of a plurality of serving nodes store a respective data copy of a same data. It is a hard issue to perform data backup and restoration on the plurality of serving nodes in the cluster. The core of the issue is how to perform the data backup and restoration and keep data consistency, data integrity and data uniform distribution under complex network environment of the clusters with consideration of performance differences between respective serving nodes.

SUMMARY

Accordingly, the application provides a method, a system and a serving node for data backup and restoration which are able to perform the data back and restoration in a distributed cache system.

To this end, the technical solutions of the application are provided as follows.

One aspect of the application provides a method for data backup and restoration, which may comprise: generating, by one of a plurality of serving nodes, a backup schedule, after receipt of a data backup request; uploading, by the serving node, the generated backup schedule to a cluster public storage block; sending, by each of the plurality of serving nodes, a copy which needs to be backed up to a target node for consolidation, according to the backup schedule; sending, by a client, a data record in a consolidated copy to the serving node through a data writing request; generating, by one of the plurality of serving nodes, a data distribution table according to a load balancing principle; sending, by the serving node, the data writing request to other serving nodes to perform a write operation, according to the generated data distribution table; and sending, by the client, a data writing request for a next data record in the consolidated copy after the write operation is completed, until the copy is completely restored.

Alternatively, the method may further comprise: after sending the data writing request to other serving nodes according to the data distribution table, storing, by the client, the data record in a linked list for failed data record restoration when the write operation fails, whenever the client sends the data writing request, the data record in the linked list for failed data record restoration is sent preferentially.

Alternatively, the cluster public storage block may be located in the serving node, and wherein data in the cluster public storage block may be accessed or modified in real time by any one of the serving nodes in the cluster.

Alternatively, the method may further comprise: before sending the copy which needs to be backed up, hot backing up, by each of the serving nodes, local data which needs to be backed up in a specified path.

Alternatively, the sending the copy which needs to be backed up to the target node may comprise: transmitting the copy which needs to be backed up to one or more target nodes external to the cluster.

Alternatively, the consolidation may comprise: consolidating, by the target node, a plurality of copies of a single data file into a latest copy according to a version number and a timestamp of the data, when the target node detects that the data in all of the serving nodes are complete according to the backup schedule.

Another aspect of the application provides a system for data backup and restoration, comprising a serving node, a client and a target node, wherein the serving node may be configured to generate a backup schedule after receipt of a data backup request, to upload the generated backup schedule to a cluster public storage block, to send a copy which needs to be backed up to a target node for consolidation, to generate a data distribution table according to a load balancing principle after receipt of a data writing request, to send the data writing request to other serving nodes according to the data distribution table to perform a write operation, and to send a notification to the client when the write operation is completed; and wherein the client may be configured to send a data record in a consolidated copy to the target node through the data writing request, and to send the data writing request for a next data record after receipt of the notification, until the copy is completely restored.

Alternatively, the service may be further configured so that after sending the data writing request to other serving nodes to perform the write operation according to the data distribution table, the client stores the data record in a linked list for failed data record restoration when the write operation fails, wherein whenever the client sends the data writing request, the data record in the linked list for failed data record restoration is sent preferentially.

Alternatively, the consolidation performed by the target node may comprise: The target node consolidates a plurality of copies of a single data file into a latest copy according to a version number and a timestamp of the data, when the target node detects that the data in all of the serving nodes are complete according to the backup schedule.

Another aspect of the application provides a serving node for data backup and restoration, which may be configured to generate a backup schedule after a receipt of a data backup request, to upload the generated backup schedule to a cluster public storage block, to send a copy which needs to be backed up to a target node for consolidation, to generate a data distribution table according to a load balancing principle after receipt of a data writing request, to send a data writing request to other serving nodes according to a data distribution table to perform a write operation, and to send a notification to a client when the write operation is completed.

Alternatively, the serving node may be further configured so that after sending the data writing request to other serving nodes to perform the write operation according to the data distribution table, the client stores the data record in a linked list for failed data record restoration when the write operation fails, wherein whenever the client sends the data writing request, the data record in the linked list for failed data record restoration is sent preferentially.

According to the method, the system and the serving node for data backup and restoration, the serving node generates a backup schedule after receipt of a data backup request, uploads the generated backup schedule to a cluster public storage block, so that each serving node sends a copy which needs to be backed up to a target node for consolidation; and the client sends a data record in a consolidated copy to the serving node through a data writing request, to generate a data distribution table according to a load balancing principle so as to send the data writing request to other serving nodes according to the data distribution table to perform a write operation, the client sends the data writing request for a next data record after the write operation is completed, until the copy is completely restored. Through the above method and system, the data backup and restoration may be performed in a complex network with the clusters with consideration of performance differences among respective serving nodes and data consistency, data integrity and data uniform distribution. In general, the above method is an effective, highly reliable data backup and restoration solution to ensure the data consistency in the distributed cache system, and is an inventive solution to address the technical issue of data backup and restoration in the distributed cache system.

DETAILED DESCRIPTION

Generally, data backup in a cluster using a distributed cache system comprises two steps: an exporting step, in which a plurality of copies of a data file in the cluster are exported to a target node; and an consolidating step, in which these copies are consolidated into a data file based on a certain consolidation algorithm after the exporting step is performed, and the consolidated data file is stored for future data restoration.

Data restoration in the cluster may be performed by data import. Specifically, a data writing request is sent to a serving node in the cluster from a client, so as to write data records in the data file into the distributed cache system one by one.

Hereinafter, the technical solutions of the application will be described in detail with reference to the drawings and the embodiments.

Figure 1:
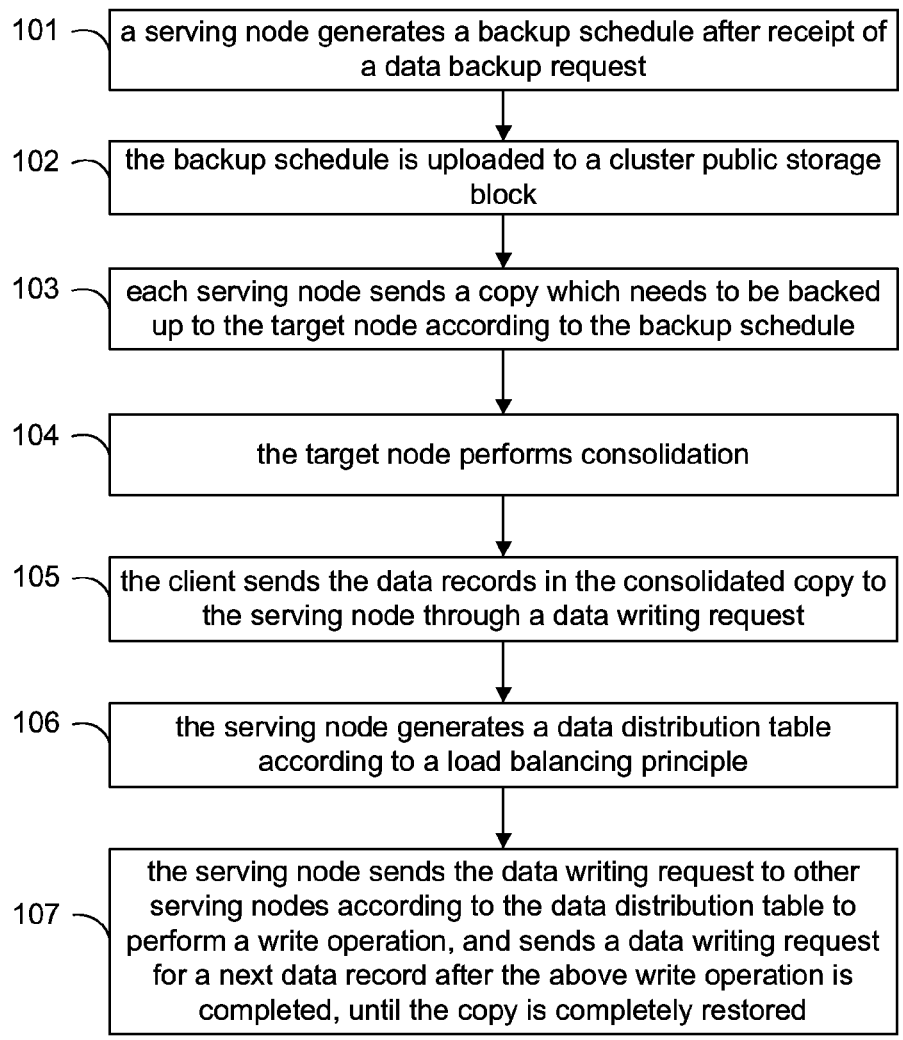
FIG. 1 is a flowchart of a method for data backup and restoration according to the application.

FIG. 1 is a flowchart of a method for data backup and restoration according to the application. As shown in FIG. 1, the method comprises the following steps.

Step 101: a serving node generates a backup schedule after receipt of a data backup request.

Specifically, a client sends a data backup request to any one of serving nodes, as desired; the serving node, which has received the data backup request, generates the backup schedule according to a data distribution table in the cluster. The serving node may be referred to as a backup schedule generating node.

Step 102: the backup schedule is uploaded to a cluster public storage block.

Specifically, the cluster public storage block is located in the serving node and the data therein may be accessed or modified in real time by any serving node in the cluster.

Additionally, after the step 102, a target node may monitor the backup schedule in the cluster public storage block and place the backup schedule to an "enable" state.

Step 103: each serving node sends a copy which needs to be backed up to the target node according to the backup schedule.

Additionally, before sending a copy which needs to be backed up, each serving node may hot back up local data, which needs to be backed up, in a specified path.

Specifically, each serving node in the cluster is able to monitor the state of the backup schedule in the public storage block; if the state is "enable", each serving node hot backs up local data, which needs to be backed up, in the specified path, and then sends the copy to the target node. The data hot backup means that the serving node completely backs up data at a certain time point without corruption of the data, even if the data is being modified. The advantage of using hot backup is that it may ensure that the data in the cluster can be backed up while being updated by the client. Additionally, after each serving node sends the copy which needs to be backed up to the target node, the serving node may send a message to the cluster public storage block, to change the backup schedule from the "enable" state to a "sent" state.

In the step of sending the copy which needs to be backed up to the target node, the copy which needs to be backed up may be transmitted to one or more target nodes external to the cluster. In this way, it may ensure that there is sufficient storage space in the target node for storing the backup data file. If the storage space in the target node is full or the target node is disconnected, another target node may be specified to continue the backup.

Step 104: the target node performs consolidation.

Specifically, the target node detects that data in all serving nodes are complete according to the backup schedule, and then consolidates a plurality of copies of a single data file into a latest copy according to attributes of the data such as a version number and a timestamp. In this way, data consistency can be ensured. The step of consolidating copies into the latest copy comprises:

Step 104a: a first copy of the data file is opened to obtain a data record, i.e., a Key and a corresponding Value;

Step 104b: other copies of the data file are opened to obtain other Values corresponding to the Key obtained in the step 104a;

Step 104c: all Value copies corresponding to the same Key are compared with each other according to latest data version number and timestamp principle, to obtain a latest Value copy.

Step 104d: a consolidated Value is written to the first copy of the data file and this data record is deleted from other copies of the data file.

Step 104e: data records in the first copy of the data file are traversed to consolidate remaining data records in other copies of the data file, so as to write the consolidated data record to the first copy of the data file.

Additionally, after the target node performs the consolidation, a message is sent to the cluster public storage block, and the backup schedule is changed to a "consolidation completed" state; the client polls whether the backup schedule is in the "consolidation completed" state, if yes, the backup process ends.

Step 105: the client sends the data records in the consolidated copy to the serving node through a data writing request.

Specifically, the client opens the consolidated copy and traverses the data records therein to fetch one data record, and adds this data record to the data writing request, and then sends the data writing request to any one of the serving nodes in the cluster.

Step 106: the serving node generates a data distribution table according to a load balancing principle.

Specifically, as the data distribution table is generated according to the load balancing principle, it can be ensure that the data may be evenly restored among the serving nodes and the data load in each serving node is balanced in the complex cluster network.

Step 107: the serving node sends the data writing request to other serving nodes according to the data distribution table to perform a write operation, and sends a data writing request for a next data record after the above write operation is completed, until the copy is completely restored.

Additionally, after the serving node sends the data writing request to other serving nodes according to the data distribution table to perform the write operation, if the write operation fails, the client stores the data record in a linked list for failed data record restoration, in which the data record in the linked list is sent preferentially, whenever the client sends the data writing request.

Figure 2:
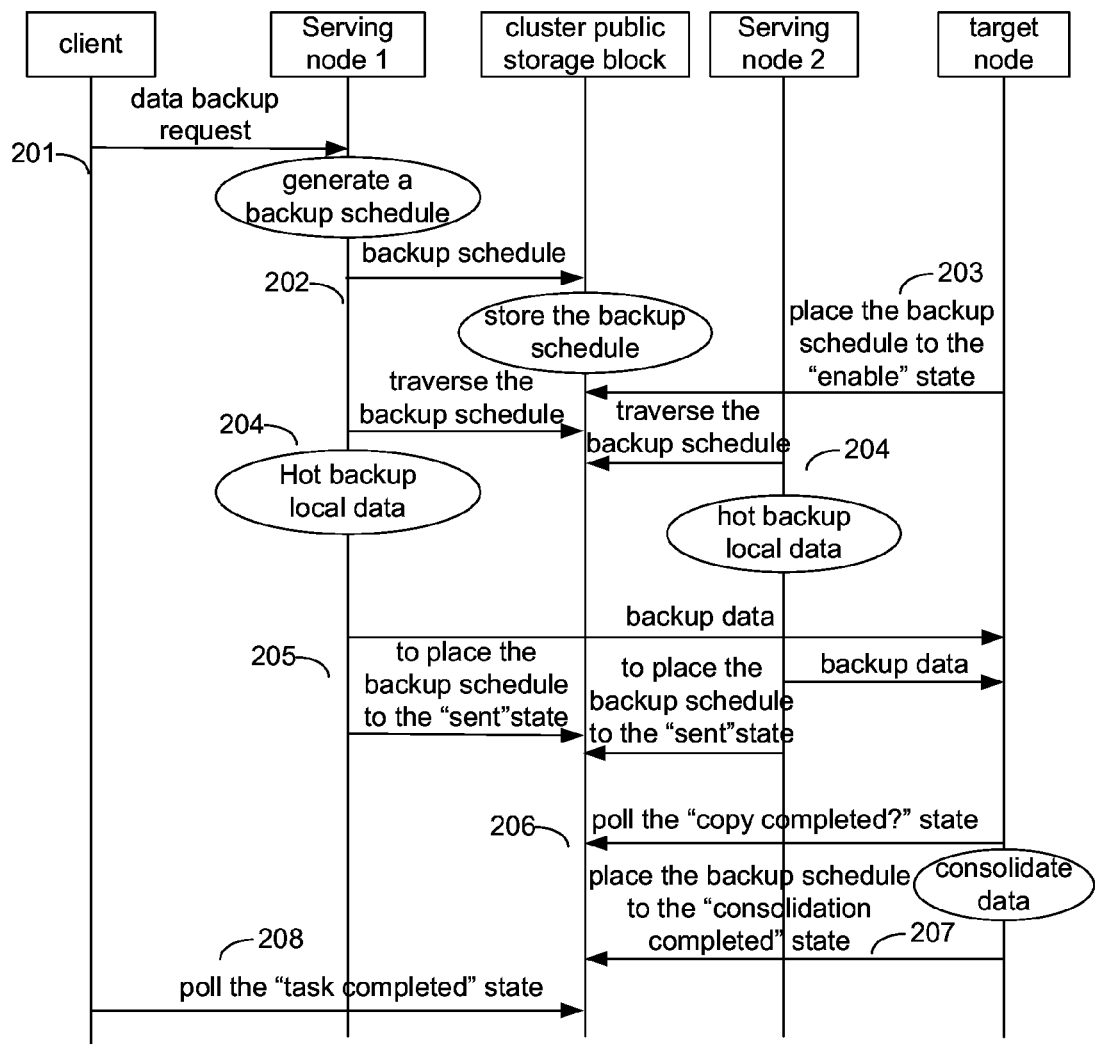
FIG. 2 is a flowchart of a method for data backup according to an embodiment of the application.

FIG. 2 is a flowchart of data backup according to an embodiment of the application. As shown in FIG. 2, the flowchart comprises:

Step 201: a client sends a data backup request to serving node 1 in a cluster, and the serving node 1 generates a backup schedule according to a data distribution table in the cluster.

Step 202: the serving node 1 uploads the local backup schedule to a cluster public storage block.

Step 203: a target node monitors the backup schedule in the cluster public storage block and then places the backup schedule to an "enable" state.

Step 204: each serving node (serving nodes 1-2 show in FIG. 2) in the cluster polls the state of the backup schedule in the cluster public storage block, if the state is "enable", each serving node hot backs up local data in a specified data directory.

Step 205: each serving node (serving nodes 1-2 show in FIG. 2) in the cluster sends the data backup in the data directory to the target node and changes the backup schedule from the "enable" state to a "sent" state.

Step 206: the target node polls whether the backup schedule is in the "copy completed" state, if yes, the target performs the consolidation.

Step 207: after the consolidation, the target node places backup schedule to a "consolidation completed" state.

Step 208: the client polls whether the backup schedule is in the "consolidation completed" state, if yes, the backup process ends.

Figure 3:
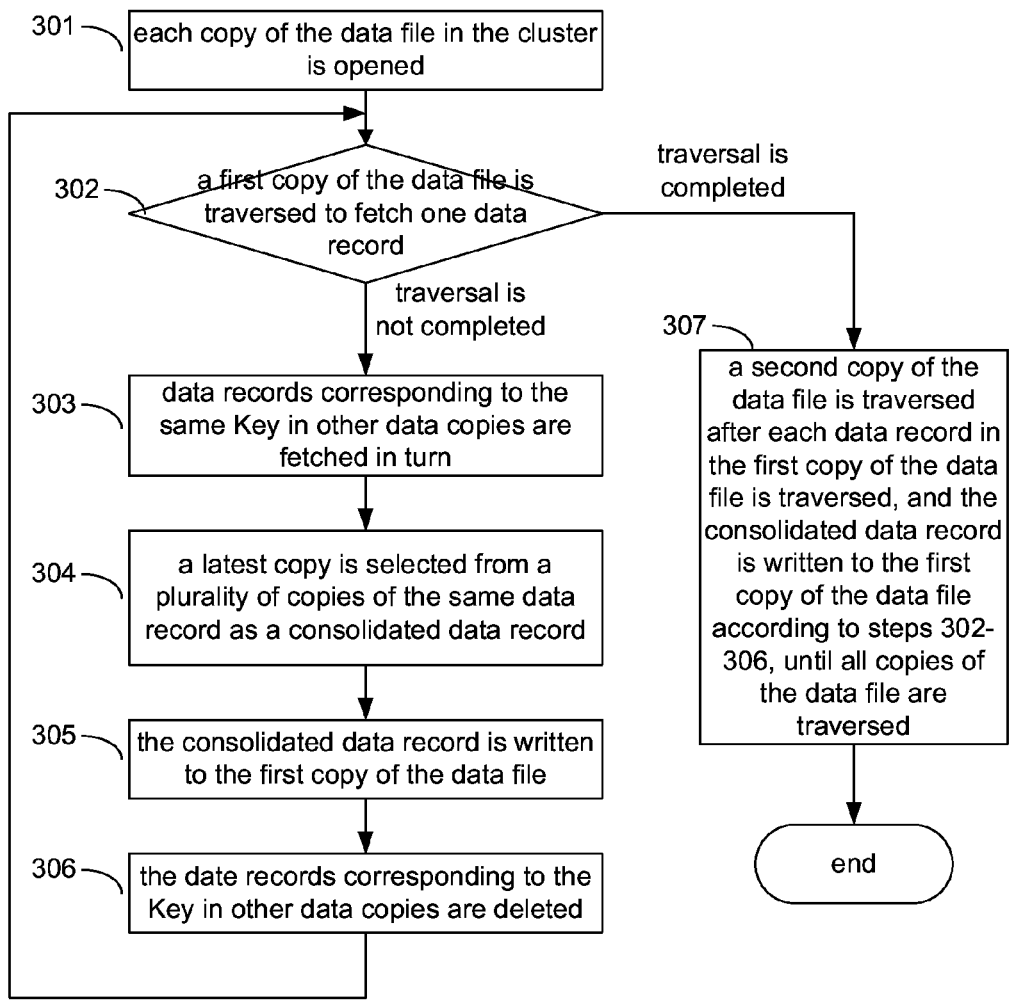
FIG. 3 is a flowchart of a method for consolidation according to an embodiment of the application.

FIG. 3 is a flowchart of consolidation according to an embodiment of the application. As shown in FIG. 3, the consolidation comprises:

Step 301: each copy of the data file in the cluster is opened.

Step 302: a first copy of the data file is traversed to fetch one data record composed of a Key, a Value, a version number, a timestamp and the like.

Step 303: data records corresponding to the same Key in other data copies are fetched in turn.

Step 304: a latest copy is selected from a plurality of copies of the same data record as a consolidated data record according to latest version number and timestamp principle.

Step 305: the consolidated data record is written to the first copy of the data file.

Step 306: the date records corresponding to the Key in other data copies are deleted.

Step 307: a second copy of the data file is traversed after each data record in the first copy of the data file is traversed, and the consolidated data record is written to the first copy of the data file according to steps 302-306, until all copies of the data file are traversed.

Figure 4:
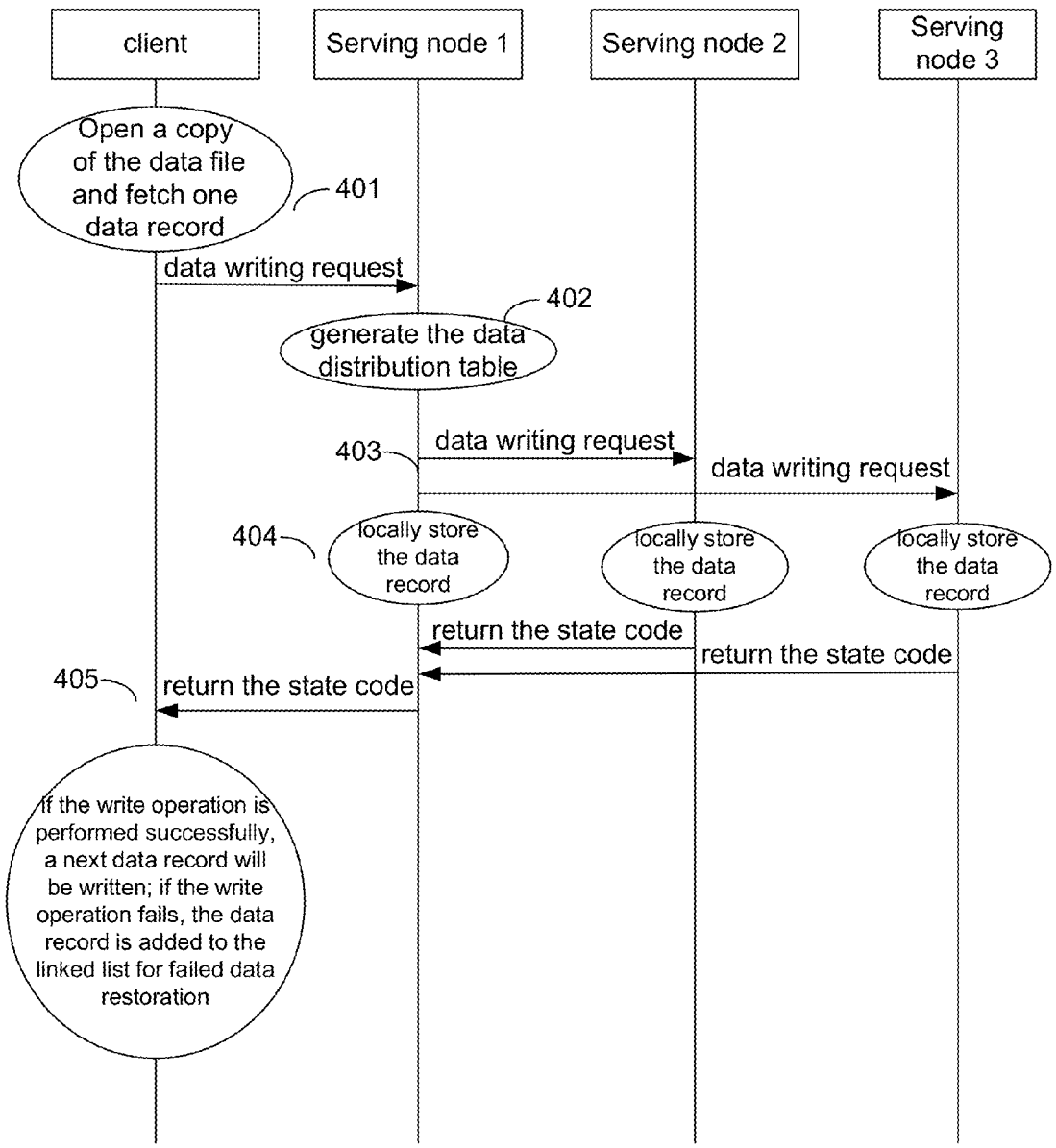
FIG. 4 is a flowchart of a method for data restoration according to an embodiment of the application.

FIG. 4 is a flowchart of data restoration according to an embodiment of the application. As shown in FIG. 4, the data restoration comprises the following steps:

Step 401: a client opens a backup data file, fetches one data record, adds the fetched date record to a data writing request, and sends the data writing request to a serving node 1 in a cluster.

Step 402: the serving node in the cluster generates a data distribution table according to a load balancing principle, after receipt of the data writing request.

Step 403: the serving node that generates the data distribution table sends the data writing request to other serving nodes according to the data distribution table.

Step 404: another serving node which receives the data writing request locally stores the data records carried by the request and returns a corresponding state code to the serving node that generates the data distribution table.

Step 405: the serving node that generates the data distribution, i.e., the serving node 1, returns the state code to the client, if the write operation is successful, the client fetches a next data record; if the write operation fails, the client stores the data record in the linked list for failed data record restoration, in which the data record is sent preferentially whenever the client sends a data writing request.

Additionally, each time before the client sends a data writing request, the client fetches a next data record from the linked list for failed data record restoration or the backup data file, and repeats steps 401 to 405, until all data records in the backup data file are successfully restored.

Figure 5:
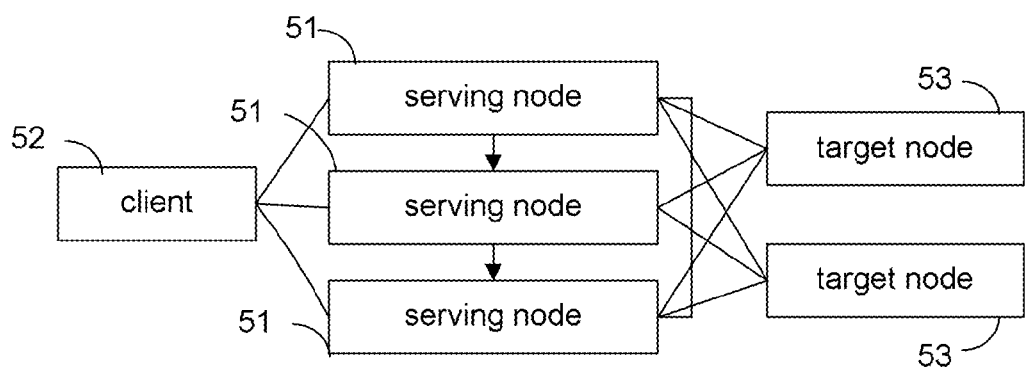
FIG. 5 is a structure diagram of a system for data backup and restoration according to the application.

FIG. 5 is a structure diagram of a data backup and restoration system according to the application. As shown in FIG. 5, the system comprises serving nodes 51, a client 52 and target nodes 53.

The serving node 51 is configured to generate a backup schedule after receipt of a data backup request; upload the backup schedule to a cluster public storage block; send a copy which needs to be backed up to the target node 53 according to the backup schedule; send the data writing request to other serving node 51 according to a data distribution table to perform a write operation, after generation of the data distribution table according to a load balancing principle when the data writing request is received; and send a notification to the client 52 after the write operation is completed.

Specifically, the client 52 sends the data backup request to any one of serving node 51, as desired; and the serving node 51, which receives the data backup request, generates the backup schedule according to the current data distribution table in the cluster. The cluster public storage block is located in the serving node 51 and data therein may be accessed or modified in real time by any one of serving node 51 in the cluster. Each serving node 51 in the cluster is able to monitor a state of the backup schedule in the cluster public storage block; if the state is "enable", each serving node 51 hot backs up local data, which needs to be backed up, in a specified path, and then sends the backup data file to the target node 53. The hot backup means that the serving node 51 completely backs up data at a certain time point without corruption of the data, even if the data is being modified. The advantage of using hot backup is that it may ensure that the data in the cluster can be backed up while being updated by the client. The serving node 51 generates the data distribution table according to the load balancing principle so as to ensure that the data may be evenly restored among the serving nodes 51 and to ensure the data load on each serving node 51 is balanced in the complex cluster network. Additionally, after the serving node 51 sends the backup data file which needs to be backed up to the target node 53, the message is sent to the cluster public storage block, and the backup schedule is changed from the "enable" state to a "sent" state.

Additionally, the serving node 51 may be configured to hot back up local data which needs to be backed up in a specified path, before sending a copy which needs to be backed up.

Additionally, the serving node 51 may be configured so that after the data writing request is sent to other serving node 51 according to the data distribution table to perform a write operation, if the write operation fails, the client stores the data record in the linked list for failed data record restoration, in which the data record in the linked list is sent preferentially, whenever the client 52 sends the data writing request.

The client 52 is configured to send a data record in the consolidated copy to the serving node 51 through the data writing request, and send the data writing request for a next data record after receiving a completion notification, until all copies are restored.

Specifically, the client 52 opens the consolidated copy and traverses data records therein to fetch one data record, adds this data record to the data writing request to be sent by the client, and then sends the data writing request to any one of serving node 51 in the cluster. The data distribution table is generated according to the load balancing principle so as to ensure that the data may be evenly restored among the serving nodes and to ensure the data load on each serving node is balanced in the complex cluster network.

The target node 53 is configured to perform the consolidation.

Specifically, the target node is one or more nodes external to the cluster. To perform the consolidation, the target node consolidates a plurality of copies of a single data into a latest copy according to attributes of the data file such as version number and timestamp, when the target node monitors that data in all serving nodes are complete according to the backup schedule.

Additionally, after performing the consolidation, the target node 53 sends a message to the cluster public storage block, and places the backup schedule to a "consolidation completed" state; the client 52 polls whether the backup schedule is in the "consolidation completed" state, if yes, the backup process ends.

Additionally, the target node 53 may be configured to monitor the backup schedule in the cluster public storage block and place the backup schedule to an "enable" state.

The application further provides the serving node 51 in the data backup and restoration system, as shown in FIG. 5.

The serving node 51 is configured to generate the backup schedule after the receipt of the data backup request; upload the backup schedule to the cluster public storage block; send the copy which needs to be backed up to the target node 53 according to the backup schedule; send the data writing request to other serving nodes 51 according to the data distribution table to perform the write operation, after generation of the data distribution table according to the load balancing principle when the data writing request is received; and inform the client 52 after the write operation is completed.

Specifically, the client 52 sends the data backup request to any one of serving node 51, as desired; and the serving node 51, which receives the data backup request, generates the backup schedule according to the data distribution table in the cluster. The cluster public storage block is in the serving node 51 and data therein may be accessed or modified in real time by any one of serving node 51 on the cluster. Each serving node 51 in the cluster is able to monitor the state of the backup schedule in the cluster public storage block; if the state is "enable", each serving node 51 hot backs up local data, which needs to be backed up, in the specified path, and then sends the backup dada file to the target node 53. The hot backup means that the serving node 51 is still able to completely back up data at a certain time point without corruption of the data, even if the data is being modified. The advantage of using hot backup is that it may ensure that the data in the cluster can be backed up while being updated by the client. The serving node 51 generates the data distribution table according to the load balancing principle so as to ensure that the data may be evenly restored among the serving node 51 and to ensure the data load on each serving node 51 is balanced in the complex cluster network. Additionally, after the serving node 51 sends the copy which needs to be backed up to the target node 53, the message is sent to the cluster public storage block, and the backup schedule is changed from the "enable" state to a "sent" state.

Additionally, the serving node 51 may be configured to hot back up local data which needs to be backed up in the specified path, before sending the copy which needs to be backed up.

Additionally, the serving node 51 may be configured so that after the data writing request is sent to other serving nodes 51 according to the data distribution table to perform the write operation, if the write operation fails, the client stores the data record in the linked list for failed data record restoration, in which the data record is sent preferentially, whenever the client sends a data writing request.

It should be understood that the foregoing description are only preferred embodiments of the disclosure and not intended to limit the patent scope of the disclosure. All changes, equivalent substitution or modifications without departing from the spirit and scope of the application shall be fall into the protection scope of the application.

The invention claimed is:

1. A method for data backup and restoration, comprising:
generating, by one of a plurality of serving nodes, a backup schedule, after receipt of a data backup request;
uploading, by the serving node, the generated backup schedule to a cluster public storage block;
monitoring, by a target node, the backup schedule in the cluster public storage block and placing the backup schedule to an "enable" state;
polling, by each of the plurality of serving nodes, the "enable" state of the backup schedule in the cluster public storage block, sending a copy which needs to be backed up to a target node according to the backup schedule, and changing the backup schedule from the "enable" state to a "sent" state;
polling, by the target node, a "copy completed" state of the backup schedule, and performing consolidation;
placing, by the target node, the backup schedule to a "consolidation completed" state after the consolidation;
sending, by a client, a data record in a consolidated copy to the serving node through a data writing request;
generating, by one of the plurality of serving nodes, a data distribution table according to a load balancing principle;
sending, by the serving node, the data writing request to other serving nodes to perform a write operation, according to the generated data distribution table; and
sending, by the client, a data writing request for a next data record in the consolidated copy after the write operation is completed, until the copy is completely restored.

2. The method according to claim 1, further comprising:
after sending the data writing request to other serving nodes according to the data distribution table,
storing, by the client, the data record in a linked list for failed data record restoration when the write operation fails,
wherein whenever the client sends the data writing request, the data record in the linked list for failed data record restoration is sent preferentially.

3. The method according to claim 1, wherein the cluster public storage block is located in the serving node, and
wherein data in the cluster public storage block can be accessed or modified in real time by any one of the serving nodes in the cluster.

4. The method according to claim 1, further comprising:
before sending the copy which needs to be backed up,
hot backing up, by each of the serving nodes, local data which needs to be backed up in a specified path.

5. The method according to claim 1, wherein the sending the copy which needs to be backed up to the target node comprises:
transmitting the copy which needs to be backed up to one or more target nodes external to the cluster.

6. The method according to claim 1, wherein the consolidation comprises:
consolidating, by the target node, a plurality of copies of a single data file into a latest copy according to a version number and a timestamp of the data, when the target node detects that the data in all of the serving nodes are complete according to the backup schedule.

7. A system for data backup and restoration, comprising a serving node, a client and a target node,
wherein the serving node is configured to generate a backup schedule after receipt of a data backup request, to upload the generated backup schedule to a cluster public storage block, to poll an "enable" state of the backup schedule in the cluster public storage block, to send a copy which needs to be backed up to a target node according to the backup schedule and change the backup schedule from the "enable" state to a "sent" state, to generate a data distribution table according to a load balancing principle after receipt of a data writing request, to send the data writing request to other serving nodes according to the data distribution table to perform a write operation, and to send a notification to the client when the write operation is completed;
wherein the target node is configured to monitor the backup schedule in the cluster public storage block and place the backup schedule to the "enable" state, to poll a "copy completed" state of the backup schedule and perform consolidation, and place the backup schedule to a "consolidation completed" state after the consolidation; and
wherein the client is configured to send a data record in a consolidated copy to the target node through the data writing request, and to send the data writing request for a next data record after receipt of the notification, until the copy is completely restored.

8. The system according to claim 7, wherein the service is further configured so that after sending the data writing request to other serving nodes to perform the write operation according to the data distribution table, the client stores the data record in a linked list for failed data record restoration when the write operation fails, wherein whenever the client sends the data writing request, the data record in the linked list for failed data record restoration is sent preferentially.

9. The system according to claim 7, wherein the consolidation performed by the target node comprises:
consolidating by the target node a plurality of copies of a single data file into a latest copy according to a version number and a timestamp of the data, when the target node detects that the data in all of the serving nodes are complete according to the backup schedule.

10. A serving node for data backup and restoration, configured to generate a backup schedule after receipt of a data backup request, to upload the generated backup schedule to a cluster public storage block, to poll the "enable" state of the backup schedule in the cluster public storage block, to send a copy which needs to be backed up to a target node according to the backup schedule and change the backup schedule from the "enable" state to a "sent" state, to generate a data distribution table according to a load balancing principle after receipt of a data writing request, to send a data writing request to other serving nodes according to a data distribution table to perform a write operation, and to send a notification to a client when the write operation is completed.

11. The serving node according to claim 10, wherein the serving node is further configured so that after sending the data writing request to other serving nodes to perform the write operation according to the data distribution table, the client stores the data record in a linked list for failed data record restoration when the write operation fails, wherein whenever the client sends the data writing request, the data record in the linked list for failed data record restoration is sent preferentially.

12. The method according to claim 2, wherein the cluster public storage block is located in the serving node, and
wherein data in the cluster public storage block can be accessed or modified in real time by any one of the serving nodes in the cluster.

13. The method according to claim 2, further comprising:
before sending the copy which needs to be backed up,
hot backing up, by each of the serving nodes, local data which needs to be backed up in a specified path.

14. The method according to claim 2, wherein the sending the copy which needs to be backed up to the target node comprises:
transmitting the copy which needs to be backed up to one or more target nodes external to the cluster.

15. The method according to claim 2, wherein the consolidation comprises:
consolidating, by the target node, a plurality of copies of a single data file into a latest copy according to a version number and a timestamp of the data, when the target node detects that the data in all of the serving nodes are complete according to the backup schedule.

16. The system according to claim 8, wherein the consolidation performed by the target node comprises:

consolidating by the target node a plurality of copies of a single data file into a latest copy according to a version number and a timestamp of the data, when the target node detects that the data in all of the serving nodes are complete according to the backup schedule.

17. The serving node according to claim 16, wherein the serving node is further configured so that after sending the data writing request to other serving nodes to perform the write operation according to the data distribution table, the client stores the data record in a linked list for failed data record restoration when the write operation fails, wherein whenever the client sends the data writing request, the data record in the linked list for failed data record restoration is sent preferentially.

* * * * *